C. A. WOOD.
Apparatus for Concentrating Liquids.
No. 47,158.  Patented April 4, 1865.
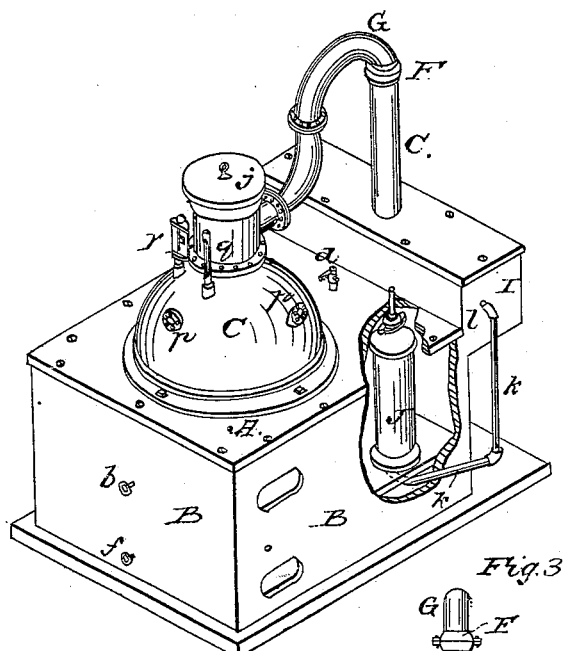
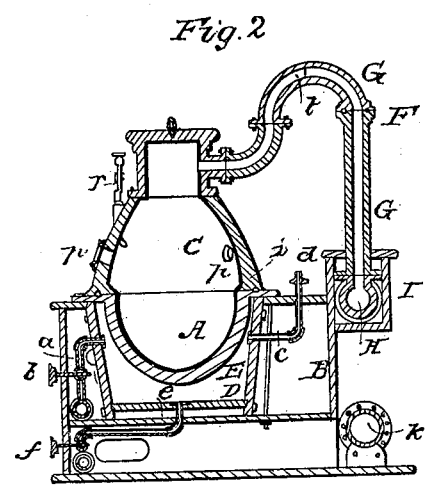
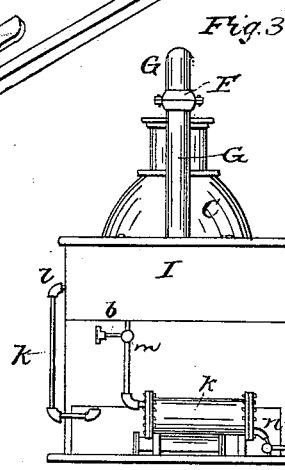
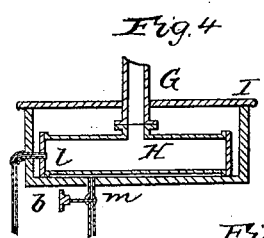
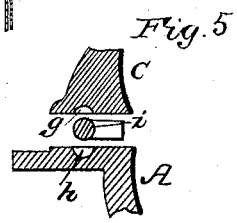
WITNESSES
INVENTOR
Chas. A. Wood

UNITED STATES PATENT OFFICE.

CHAS. A. WOOD, OF DORCHESTER, MASS., ASSIGNOR TO DANIEL C. HOOD, OF SAME PLACE, AND W. H. S. JORDAN, OF WEST ROXBURY, MASS.

IMPROVED APPARATUS FOR CONCENTRATING LIQUIDS.

Specification forming part of Letters Patent No. 47,158, dated April 4, 1865.

*To all whom it may concern:*

Be it known that I, CHARLES A. WOOD, of Dorchester, in the county of Norfolk and State of Massachusetts, have invented an Improved Apparatus for Concentrating Liquids, of which the following is a full, clear, and exact description, reference being had to the accompanying drawings, making part of this specification, in which—

Figure 1 is a perspective view of my improved apparatus, a portion of the frame-work being broken away to show the air-pump. Fig. 2 is a central vertical section through the same. Fig. 3 is an end elevation of the same. Fig. 4 is a central longitudinal section through the condenser; Fig. 5, a detail to be referred to hereinafter.

In vacuum-pans for concentrating liquids, as heretofore constructed, a metallic jacket has been placed around the bottom of the pan, into which steam was admitted for the purpose of heating the liquid. It was found impossible, however, to produce a sufficient degree of heat by this contrivance alone, on account of the radiation of the heat from the steam-jacket; and it therefore became necessary to place a coiled pipe within the pan, through which pipe steam was permitted to circulate. This coiled pipe, however, was objectionable, as its position rendered it extremely difficult to cleanse it and the bottom of the pan, and it also materially increased the cost of the apparatus. An auxiliary reservoir has also been used, especially in that class of vacuum-pans used for concentrating milk, the milk being kept in vacuum in this reservoir and drawn off into the vacuum-boiler when it was to be evaporated; but this apparatus was complicated and expensive.

My invention has for its object to avoid these objections, as well as to produce a simple and effective apparatus at a greatly reduced cost; and it consists in the use of a vacuum-pan surrounded by a steam-jacket of non-conducting material, whereby I am enabled to produce a sufficient degree of heat without the use of a coiled pipe within the pan, which enables me to keep the pan clean and free from impurities, the liquid to be evaporated being poured directly into the vacuum-pan, instead of being first placed in an auxiliary vessel or reservoir; and my invention also consists in the use of an elastic packing between the dome and the pan, by which I am enabled to rely on the atmospheric pressure to make the joint, thereby dispensing with the screws and nuts or other fastenings heretofore employed.

To enable others skilled in the art to understand and use my invention, I will proceed to describe the manner in which I have carried it out.

In the said drawings, A is the pan or boiler, which is constructed of iron, and has its interior surface lined with enamel. This pan is set in the frame-work B and is provided with a dome, C.

D is a jacket, of wood or other non-conducting material, which surrounds the pan A, forming a space, E, into which steam is admitted through the pipe *a*, which is commanded by a valve, *b*, the cold air being driven out through the pipe *c*, which is provided with a cock, *d*, which is closed when the air is entirely displaced, which is ascertained by the escape of steam at the cock *d*. The water of condensation passes out through the pipe *c*, which enters at the bottom of the jacket, and is provided with a cock, *f*. By thus forming the steam-jacket of wood or other non-conducting material all loss of heat from radiation is prevented, and the liquid in the pan A can be readily boiled with the steam at a low pressure without the use of a coiled pipe within the pan—a desideratum heretofore unattained.

The dome C, which is also constructed of iron lined with enamel, is provided at its lower edge with a groove, *g*, (seen enlarged in Fig. 5,) which fits over a corresponding groove, *h*, in the upper edge of the pan A. In this groove *h* is placed a circular packing-ring, *i*, of vulcanized rubber or other elastic material, and thus as a vacuum is formed within the dome it is forced down by the pressure of the external atmosphere onto the elastic packing *i*, and a perfectly tight joint is secured without the use of screws and nuts or other fastenings, and the joint F in the pipe G being packed in a similar manner, when it is desired to remove the dome for the purpose of pouring in the liquid to be evaporated, it is simply necessary to relieve the external pressure of the air, when it can be raised up by means of a rope or chain passed over a pulley and attached to the eye $j$. Instead of the packing-ring $i$ being circular in section, it is evident that a flat ring may be interposed between the pan and dome, one or both of them being provided with a sharp edge for indenting the packing. The vacuum-pipe G is connected at its lower end with a horizontal cylinder, H, which is surrounded by a chest, I, through which a stream of cold water is caused to flow constantly, for the purpose of rapidly condensing the vapor as it is drawn out of the dome by means of the air-pump J, which is connected with the cylinder H by the pipe $k$, which enters it at $l$, Fig. 4.

$m$ is a pipe which enters the bottom of the cylinder H, and communicates with a reservoir, K, into which passes the liquid formed by the condensation of the vapor. When the reservoir K is filled, (which is indicated by a suitable gage,) the cock 6 in the pipe $m$ is closed and the cock $o$ in the pipe $n$ opened, allowing the contents to be drawn off through the pipe $n$, and the amount of liquid condensed can thus be exactly ascertained.

$p$ are peep-holes in the dome C, through which the progress of the evaporation can be watched, an upright post with a scale projecting up from the bottom of the pan being employed to indicate when the liquid has been evaporated to the required point.

$q$ is a thermometer for ascertaining the temperature within the pan, and $r$ a barometer or vacuum-gage for indicating the amount of pressure.

The pipe G is lined with enamel as far as the point $t$, as any vapor which is condensed before it arrives at that point runs back into the pan.

By thus constructing the pan, with its dome and pipes, out of iron (in lieu of copper, as heretofore) and lining them with enamel I am enabled to greatly reduce the cost of the apparatus, and avoid all danger of imparting any poisonous properties or disagreeable taste or odor to the liquid being evaporated, which was frequently the case where a copper pan with a coiled pipe at the bottom was employed.

Operation: The dome being raised, as before explained, the milk or other liquid to be concentrated is poured into the pan A, when the dome is lowered down into place. Steam at a pressure of fifteen pounds to the inch, or thereabout, is then admitted into the space E by means of the pipe $a$, and the air-cock $d$ is opened to allow the air to escape. As soon as the air is driven out, which is indicated by the escape of steam from the cock $d$, it is closed, and the air-pump J is set in operation, which draws out the air and vapor through the pipe G into the horizontal cylinder H, where it is condensed, the cylinder H being kept cool by means of the water in the chest I, as before described. The liquid formed by the condensation of the vapor then passes down the pipe $m$ into the reservoir K, from which it is drawn off through the pipe $n$. As soon as the air-pump commences to operate and a vacuum is established within the pan the external pressure of the atmosphere upon the dome C compresses the elastic packing $i$, which thus forms a perfectly tight joint without the use of any other fastenings, and a vacuum is thus produced within the pan, as indicated by the barometer. When the liquid has been evaporated to a sufficient degree, which is ascertained by means of the peep-holes P, as explained, and also by the amount of liquid drawn from the reservoir K, the operation of the air-pump is arrested, and air is admitted into the dome, when it is free to be raised from the pan A, the contents of which can then be removed and the pan thoroughly cleansed.

The above apparatus is compact, cheap, and simple in its construction, and can be operated at a much less cost than any others with which I am acquainted.

What I claim as my invention, and desire to secure by Letters Patent as an improvement in vacuum-pans, is—

1. The pan A, in combination with a steam-jacket, D, of wood or other non-conducting material, operating substantially as set forth, for the purpose specified.

2. An elastic packing for the joints of vacuum-pans, operating substantially as described.

3. The within-described apparatus for concentrating liquids, consisting, essentially, of the pan A, with its jacket D, packing $i$, and dome C, and the condenser H I, the whole combined and operating substantially as set forth.

CHAS. A. WOOD.

Witnesses:
P. E. TESCHEMACHER,
W. J. CAMBRIDGE.